United States Patent Office 3,421,186
Patented Jan. 14, 1969

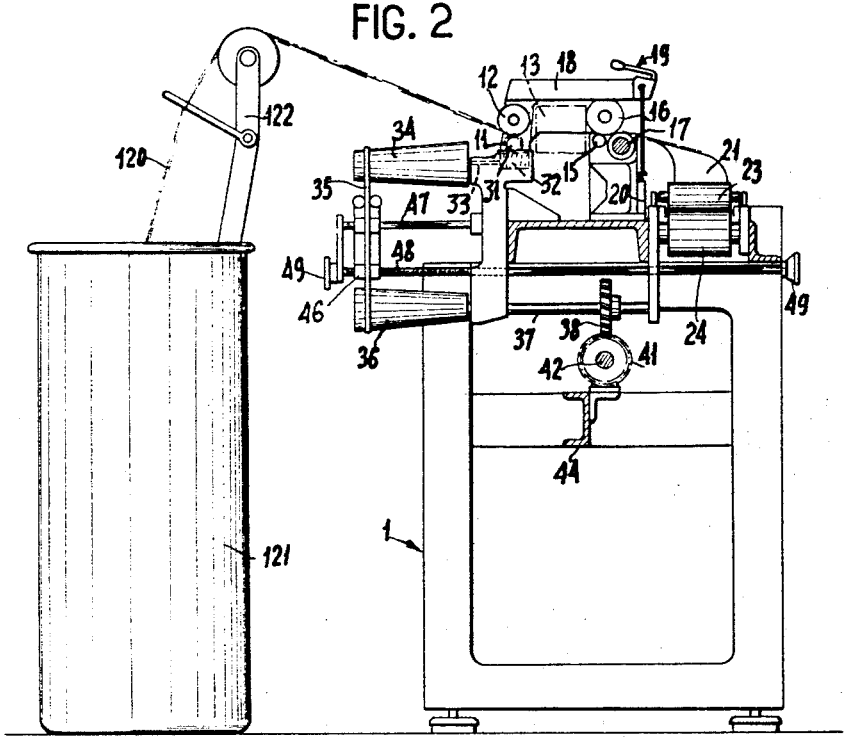
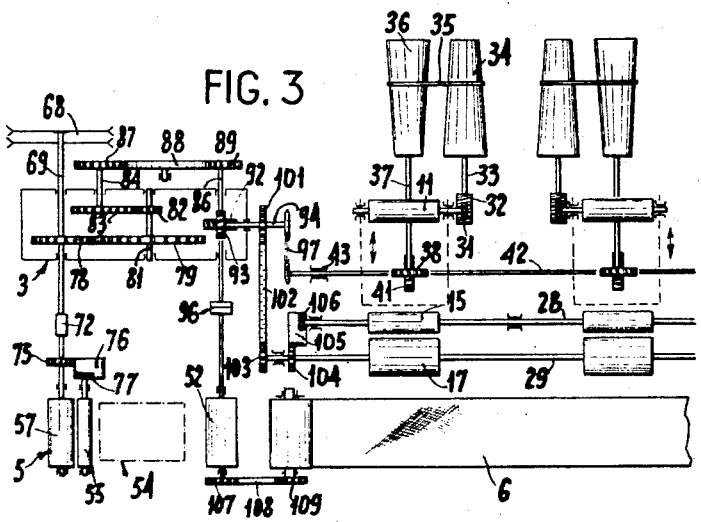

3,421,186
MIXING TEXTILE FIBRE SLIVERS
Hubert Halleux, Mulhouse, Haut-Rhin, and Michel Masurel, Wasquehal, Nord, France, assignors to Societe Alascienne de Constructions Mecaniques de Mulhouse, Mulhouse, France, and Brevets et Applications Textiles Brevatex, Tourcoing, Nord, France, both French companies
Filed Apr. 26, 1966, Ser. No. 545,374
Claims priority, application France, Apr. 27, 1965, 14,759
U.S. Cl. 19—243   1 Claim
Int. Cl. D01h 5/22

ABSTRACT OF THE DISCLOSURE

A fibre blending machine for producing a composite web of fibres for spinning. Each of a series of separate drawing heads supplies a single component of the final web to a belt conveyor. The output of the individual heads are placed successively on the conveyor in superposed relationship being delivered from the conveyor to an output or blending head. Each individual head comprises supply and drawing rollers. A common drive motor is used, change gears being provided for adjusting the speeds of the conveyor, the input and drawing rolls of the blending or output head, and the drawing rolls of the individual heads. A manually adjustable continuously variable cone and belt drive in each individual head permits separate adjustment of the feed roller speed, and hence the output of each individual head.

---

Figure 1:
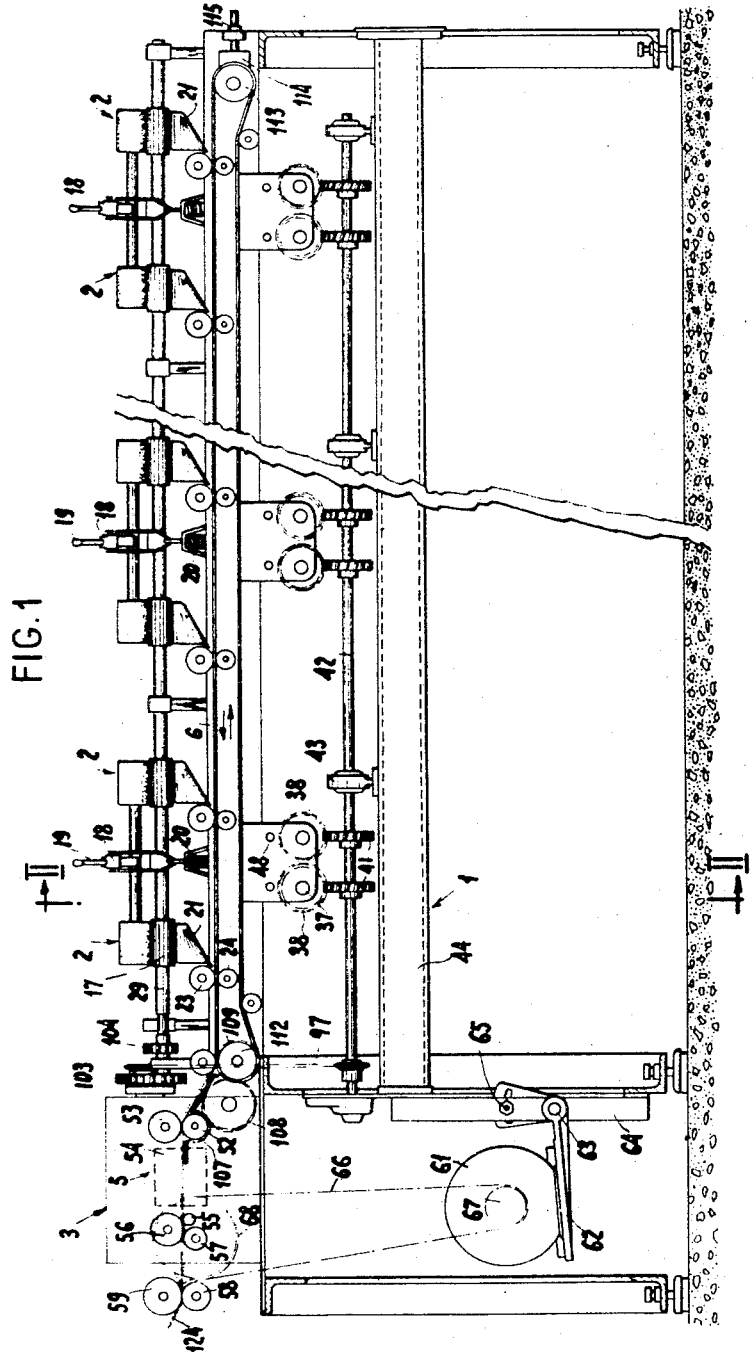

This invention relates to a method and apparatus for performing mixing operations in connection with the preparatory blending of textile fibres prior to spinning in order to obtain yarns consisting of fibres of a desired predetermined nature and qualities by combining desired proportions and, when appropriate, desired colourings, according to the requirement of the end product.

The invention provides a mixing method and apparatus which can give adjustable blending by simple means. To this end, in the method according to the invention, one sliver of each component or a very small number of slivers of each component is or are taken, the slivers being of any weight per metre run but sufficiently regular on the average, each component sliver or sliver group is drawn individually at an appropriate drawing rate in order to obtain the same number of drawn slivers of respectively predetermined weight per metre run and corresponding to the required proportions of the various components in the final mixture, and the individually drawn slivers are then united, preferably having first been superposed to form a common lap of substantial width of the required mixture.

The quantity of each component or ingredient present in the final lap can therefore be controlled very accurately since the rate at which each individual sliver is introduced into the corresponding drawing head is controllable. Storage of the components is made much easier too, since only a very small number of different component slivers need be stored. The preparation of various mixtures is also greatly simplified.

The mixing apparatus according to the invention comprises a number of separate drawing heads each having individual means for adjusting the drawing rate, each drawing head delivering its output to a conveyor belt or equivalent transfer means, a common uniting head being provided which preferably includes drawing means and is disposed at the downstream end of the conveyor belt.

Various kinds of drawing heads, such as spiked rollers or straight needle rows can be provided in such an apparatus and there can be individual adjustment in each head of the various features such as lap tension, spacing of the various instrumentalities, and so on, to ensure satisfactory adaptation to each component sliver. If required, instead of just a single sliver, a number of component slivers can be introduced into each individual drawing head.

A check on mixture composition can be made immediately by weighing the various components as they leave the individual drawing heads, and so any correction required can be made immediately without waste of raw material.

Advantageously, the apparatus comprises an elongated frame on which the individual drawing heads are aligned side by side. An electric motor, at one end of the machine, drives a geared headstock from which extend a first shaft, driving the drawing heads, a second shaft, driving the conveyor belts and the feed rollers of the blending or uniting head, and a third shaft, driving the delivery rollers of the mixing head.

In the embodiment illustrated, the feed rollers of each drawing head are connected by a variable-ratio transmission, such as a belt associated with two reversed conical drums, to a common longitudinal shaft connected to the said first shaft extending from the headstock. The bottom drawing rollers of all the drawing heads are mounted on a common longitudinal shaft which is also connected, preferably via interchangeable gearing, to the said first shaft extending from the headstock.

The invention will be more clearly understood from the following description and accompanying drawings which show by way of example an embodiment of a textile fibre sliver mixer according to the invention.

Referring to the drawing:
FIG. 1 is a front view of the complete apparatus;
FIG. 2 is a section substantially on the line II—II in FIG. 1; and
FIG. 3 is a diagrammatic bottom plan view of that part of the machine which is on the left-hand side of FIG. 1.

The apparatus shown comprises a generally elongated frame 1 comprising a plurality of drawing heads 2 grouped in pairs and driven from a headstock 3 disposed at the left hand end of the frame 1; also disposed on the frame 1 is a uniting head 5 supplied by a longitudinal conveyor belt 6 to which the slivers are delivered from the various individual drawing heads 2.

The heads 2 can be of any appropriate conventional construction and various kinds of head can be used in a single apparatus. By way of example, each drawing head is shown as comprising a pair of feed rollers 11, 12 (FIG. 2), some conventional form of fibre-retaining system 13, shown as a chain-dotted-line rectangle, and a pair of drawing rollers 15, 16 associated with a cooperating extra bottom roller 17. The top rollers 12, 16 are mounted on a weighting arm 18 having a saddle 19 connected to a resilient system 20 mounted on the frame 1. The top rollers of the two adjacent heads belonging to a single pair are, as is conventional, borne by common shafts supported at their midpoints in the same common weighting arm 18.

A stationary sheet-metal member 21 of skew shape is disposed at the delivery side of the drawing rollers of each head and serves to guide the lap of drawn fibers in a direction perpendicular to its delivery direction and to place the lap on the conveyor belt 6 immediately in front of a roller 23 resting thereon above a supporting cylinder 24 upon which the upper reach of the conveyor belt 6 is carried.

The bottom drawing rollers 15, 17 of all the heads are mounted on two common drive shafts 28, 29 respectively, which extend throughout the entire length of the apparatus and which are driven from the headstock 3 as hereinafter described, so that the drawing rollers 15, 17 of all the heads 2 run at the same speed.

However, in order that the drawing rate may be varied appropriately and individually in each head, each bottom feed roller 11 is driven via a variable-speed transmission system comprising the following items: a worm gear 31 rigidly connected to the feed roller; a worm 32 which meshes with the worm gear 31 and which is fast on a shaft 33; a driven cone 34 which is rigidly connected to the shaft 33 and over which a belt 35 runs; a driving cone 36 over which the belt 35 also runs and which is fast on a shaft 37 parallel to the shaft 33, the apex angles of the two cones 34, 36 being equal and oppositely directed relatively to one another; a helical gear 41 fast on shaft 42 which meshes with a helical gear 38 fast on shaft 37 (FIG. 2), shaft 42 extending throughout the entire length of the apparatus and running in bearings 43 rigidly connected to a longitudinal structural member or U-beam 44 of the frame 1, the shaft 42 also being driven from the headstock 3 as will be described hereinafter.

The belt 35 running over the two cones 34, 36 is guided by a movable guide member 46 which comprises spaced guide rollers and which is slidable along a smooth horizontal rod 47 fixedly secured to the frame 1, the movement of the guide 46 being parallel to the plane defined by the axes of the two cones 34, 36. The guide or carriage 46 can be moved along the rod 47 by means of an adjustment screw 48 which is so disposed in the frame 1 as to be rotatable therein but not axially movable relatively thereto, the screw 48 engaging in a complementary tapped hole in the carriage 46. The adjustment screw 48 is provided with hand wheels 49 at opposite ends, so that when the screw 48 is rotated in either direction by operation of one of the hand wheels 49, the carriage 46 moves along the fixed guide rod 47 and there is a corresponding movement of the belt 35 along the two cones 34, 36, so that the speed at which the feed rollers 11, 12 of the corresponding head are driven by the common constant-speed longitudinal shaft 42 can be separately varied, individually for each head. The uniting head 5 comprises a pair of feed rollers 52, 53 disposed beyond the downstream end of the belt 6, some appropriate conventional form of fibre-retaining system 54, shown diagrammatically as a chain-line rectangle, a bottom drawing roller 55, a top drawing roller 56, an extra bottom roller 57 and a pair of delivery rollers 58, 59.

All the instrumentalities of the machine are driven by a common electric motor 61 mounted on a bracket 62 pivoted on a horizontal spindle 63 to an upright support member 64 which is rigidly connected to the frame 1; a clamping or locking system 65 is provided to maintain the tension of a belt 66 which connects the motor pulley 67 to a driven pulley 68 fast on a headstock input shaft 69 (FIG. 3).

The shaft 69 is directly connected via a coupling 72 to the bottom drawing roller 57 of the uniting head 5. The immediately adjacent drawing roller 55 of the head 5 is driven through the coupling 72 via a gear train 75–77.

Inside the headstock 3 the shaft 69 is connected via a reduction gear 78, 79 to an internal intermediate shaft 81 which is, in turn, connected via speed reducing gears 82, 83 to an external intermediate shaft 84 which is shown connected to a first output shaft 86 of the headstock 3 via a set of interchangeable speed changing gears 87–89. The first headstock output shaft 86 is connected, via a pair of spiral gears 92, 93 meshing at right-angles with one another, to a second headstock output shaft 94 which extends axially of the machine.

Via a coupling 96 the first output shaft 86 is connected to the bottom retaining roller 52 of the uniting head 5, and the second output shaft 94 is connected by a chain transmission 97 to the longitudinal drive shaft 42 for the individual drawing heads, as hereinbefore described.

Through the agency of interchangeable speed changing gears 101–103 the second output shaft 94 drives the shaft 29 which is common to all of the bottom drawing rollers 17 of the drawing heads 2 of the apparatus; the shaft 28 which is common to all of the immediately previous bottom drawing rollers 15 is driven from the shaft 29 via an interchangeable speed changing gear train 104–106.

The conveyor belt 6 is driven from the shaft of the bottom feed roller 52 of the uniting head 5 via a speed changing gear train 107–109, the gear 109 being fast on the shaft of end roller 112 of the belt 6. The other end roller 113 thereof is disposed on longitudinally adjustable support member 114 associated with a screw system 115 enabling belt tension to be controlled.

In FIG. 3, the two cones 34, 36 of the variable-speed belt transmission are shown horizontally spaced, for clarity of diagrammatic illustration; actually, however, the cone 34 is immediately above the cone 36 as shown in FIG. 2.

A supply can 121 (FIG. 2) is located at the entry to each individual drawing head 2; the can 121 has a guide 122 for guiding the sliver 120 leaving the can and passing to the nip of the feed rollers 11, 12.

The operation of the apparatus is very simple. Assuming that the various speed changing and other adjustments have been made, electric motor 61 drives, through the lines of drive hereinbefore described, the feed rollers 11, 12 of each drawing head at an individually adjusted speed depending upon the position of the belt 35 on the corresponding cones 34, 36; also, the electric motor 61 drives all the drawing rollers 15, 16, 17 of the various heads at a uniform speed which is the same for all the heads and which depends upon the particular speed changing gears 101–103 selected; also, the motor 61 drives the conveyor belt 6 at a speed which is related to the speed of the feed roller 52 of the uniting head 5 in dependence upon the combination of the speed changing gears 107–109. The motor 61 also drives the drawing rollers 55, 56, 57 of the uniting head 5 at a speed which is always the same and which corresponds to the overall or combined delivery rate of the apparatus.

The sliver 120 leaving the drawing head 2 which is next to the upstream end of the conveyor belt is guided by the guide 21 to the conveyor belt 6 which moves the sliver to the left in FIG. 1. Consequently, the sliver leaving the adjacent or second drawing head is superposed on the sliver delivered by the first drawing head, and so on, so that at the downstream end of the conveyor belt all the slivers delivered by the various drawing heads are disposed on the belt one above the other in stacked relationship and ready to enter the uniting or blending head 5. The delivery rollers 58, 59 thereof deliver a blended lap 124 the composition of which is completely predetermined and which includes, in predetermined proportions, various component laps, as 120, separately introduced into the blended output lap 124 by the various heads 2.

Varying the speed changing gears 87–89 provides an overall adjustment of the speeds of all of the individual drawing heads 2, of the conveyor belt 6 and of the feed rollers 52, 53 of the mixing or uniting head 5, so that inter alia the drawing rate in the head 5 can be determined.

Varying the speed changing gears 101–103 provides an overall variation of the common speed of the drawing rollers 15, 16, 17 of the individual heads 2 so that inter alia the tension of the slivers between all of the drawing rollers 15, 16, 17 and the conveyor belt 6 can be varied. Varying the relationship between the speeds of each individual belt transmission 35 of the drawing heads varies the drawing rate since only the speed of feed rollers 11, 12 is varied, the speed of the drawing rollers 15, 16, 17 being independent of the belt and cone transmission system.

Also, each input drawing head 2 can be individually adapted to the particular work to be performed; for instance, the conventional fibre-retaining system 13 may or may not comprise a spiked roller and may have smooth bars or bars with needle rows.

Also, the spacing between the retaining system 13 and the drawing rollers 15, 16, 17 can be varied individually for each drawing head. Also, the feed roller system 11, 12 can readily be shifted horizontally, the worm wheel 31 of the feed roller system 11, 12 remaining in mesh with the worm 32 during such shift since the length of worm 32 is chosen accordingly.

The machine is also very easy to use and very flexible. Webs of fibers placed one above another over their full widths greatly help in colour mixing in a way which is very useful to obtain colouring effects without streakiness, as occurs when a number of slivers are placed one above another. The final lap is very uniform, so that no extra pass with doubling and drawing is required.

The invention is not, of course, limited to the embodiment described and shown and can be modified to suit particular uses without necessarily departing from the scope of the invention.

For instance, the drawing rollers 15, 16, 17 of the various drawing heads can be driven individually instead of being mounted on a common longitudinal shaft and driven in unison, in which event the drawing rollers of the variour drawing heads can run at different speeds if individual tension adjustment between the drawing rollers of the various heads and the conveyor belt is desired.

We claim:

1. A drawing and blending machine of the class described, comprising: a plurality of individual drawing heads; feed roll means and drawing roll means included in each of said individual heads; a blending drawing head; conveyor means extending from all of said individual drawing heads to said blending drawing head; drive means for operating all of said heads and said conveyor means simultaneously; a transmission gearing connected to said drive means for causing said conveyor means, said blending head and the drawing roll means of said individual drawing heads to operate in unison at predetermined substantially constant speeds, and a controllable variable speed driving means between said transmission gearing and the feed roll means of each individual drawing head to vary the speed ratio between said feed roll means and their associated drawing roll means in accordance with the desired proportion of drawn component sliver to be delivered to said conveyor means, said variable speed driving means comprises two rollers with spaced parallel rotational axes and having oppositely directed frusto-conical surfaces of equal apex angles; an endless belt passing over and frictionally engaging said surfaces to provide a driving connection between said rollers; and speed adjustment means for displacing said belt axially of said rollers.

References Cited

UNITED STATES PATENTS

| | | | |
|---|---|---|---|
| 277,606 | 5/1883 | Prest | 19—243 |
| 630,813 | 8/1899 | Meats | 19—243 |
| 2,896,269 | 7/1959 | Gardella et al. | 19—243 |
| 3,063,101 | 11/1962 | Andreani | 19—243 |
| 3,327,356 | 6/1967 | Andreani | 19—243 |
| 1,619,985 | 3/1927 | Morton | 19—293 |

FOREIGN PATENTS 498,148  1/1939  Great Britain.

MERVIN STEIN, *Primary Examiner.*

DORSEY NEWTON, *Assistant Examiner.*